United States Patent [19]

Schomäcker et al.

[11] Patent Number: 5,258,484
[45] Date of Patent: Nov. 2, 1993

[54] PROCESS FOR THE PRODUCTION OF POLYCARBONATE

[75] Inventors: Reinhard Schomäcker, Leverkusen; Uwe Hucks, Alpen; Günther Weymans, Leverkusen; Wolfgang Herrig, Bergisch Gladbach; Jürgen Kirsch, Leverkusen, all of Fed. Rep. of Germany

[73] Assignee: Bayer Aktiengesellschaft, Leverkusen, Fed. Rep. of Germany

[21] Appl. No.: 902,356

[22] Filed: Jun. 19, 1992

[30] Foreign Application Priority Data

Jun. 27, 1991 [DE] Fed. Rep. of Germany ....... 4121212

[51] Int. Cl.$^5$ ............................................. C08G 64/24
[52] U.S. Cl. ..................................... 528/196; 526/64; 528/198; 528/199
[58] Field of Search ................. 528/196, 198, 199; 526/64

[56] References Cited

U.S. PATENT DOCUMENTS

| | | | |
|---|---|---|---|
| 3,945,969 | 3/1976 | Horn et al. | 260/47 XA |
| 4,122,112 | 10/1978 | Koda et al. | 260/463 |
| 4,737,573 | 4/1988 | Silva et al. | 528/371 |
| 4,810,813 | 3/1989 | Kosky et al. | 558/281 |
| 4,962,140 | 10/1990 | Diamantoglou | 524/35 |
| 5,011,967 | 4/1991 | Silva et al. | 558/281 |
| 5,047,497 | 9/1991 | Tamura et al. | 528/196 |

FOREIGN PATENT DOCUMENTS

| | | |
|---|---|---|
| 0304691 | 3/1989 | European Pat. Off. . |
| 306838 | 3/1989 | European Pat. Off. . |
| 4118232 | 8/1991 | Fed. Rep. of Germany . |
| 1409614 | 10/1975 | United Kingdom . |

*Primary Examiner*—Harold D. Anderson
*Attorney, Agent, or Firm*—Joseph C. Gil; Aron Preis

[57] ABSTRACT

A process for the continuous production of a thermoplastic aromatic polycarbonate is disclosed. Accordingly, in a reactor system which includes a tube reactor and a tank equipped with a stirrer, there are reacted a preheated dialkali diphenolate aqueous solution with gaseous phosgene in $CH_2Cl_2$ and/or in chlorobenzene solution containing excess phosgene, in a mixer to form a mixed emulsion. The emulsion is then transported at least partly against the force of gravity into the tube reactor to facilitate a polycondensation reaction and in which after a residence time of at least 10 seconds and without dissipation of the heat of reaction there is added a chain terminator. The heat of reaction is dissipated in said tank and aqueous sodium hydroxide and catalyst are added to complete the reaction. The process according to the invention leads to high yields of phosgene.

8 Claims, No Drawings

PROCESS FOR THE PRODUCTION OF POLYCARBONATE

FIELD OF THE INVENTION

The invention relates to a process for producing polycarbonate and more specifically to the two phase interfacial polycondensation process for preparing thermoplastic aromatic polycarbonates.

SUMMARY OF THE INVENTION

A process for the continuous production of a thermoplastic aromatic polycarbonate is disclosed. Accordingly, in a reactor system which includes a tube reactor and a tank equipped with a stirrer, there are reacted a preheated dialkali diphenolate aqueous solution with gaseous phosgene in $CH_2Cl_2$ and/or in chlorobenzene solution containing excess phosgene, in a mixer to form a mixed emulsion. The emulsion is then transported at least partly against the force of gravity into the tube reactor to facilitate a polycondensation reaction and in which after a residence time of at least 10 seconds and without dissipation of the heat of reaction there is added a chain terminator. The heat of reaction is dissipated in said tank and aqueous sodium hydroxide and catalyst are added to complete the reaction. The process according to the invention leads to high conversion phosgene to polycarbonat.

BACKGROUND OF THE INVENTION

In the two-phase interfacial process for the production of polycarbonates, a better conversion of the raw materials and effective phase separation can be obtained by conducting the reaction in such a way that very few, if any, unwanted secondary reactions take place and the emulsion can readily be separated. There has been no shortage of efforts in this direction.

Thus, DOS 2,305,144 describes a process for the continuous production of polycarbonates, in which the two reactive phases are combined in the presence of amines in a mixing zone under essentially oil-in-water emulsion conditions and the phosgenation step takes place in a reaction zone after mixing. Specially designed flow arrangements are intended to ensure that the volume-time yield of the reaction is increased. The disadvantage lies in the large quantity of aqueous phase which promotes the secondary phosgene reactions.

According to DOS 2,353,939, the properties of a polycarbonate produced by the two-phase interfacial method are said to be improved by controlling the reaction through adjustment of the pH value. The disadvantage lies in the excess phosgene used, in addition to which the process is not continuous.

According to the teaching of EP 0,282,546, chloroformyl-terminated condensates are said to be obtained with high phosgene yields by a version of the two-phase interfacial process in which a stable diphenol/water/sodium hydroxide suspension and phosgene are continuously introduced at the same time into an organic phase and the reaction product is subsequently isolated. pH values of 2 to 5 are maintained during the reaction. Disadvantages arise out of the technical problems involved in dosing the suspension and the low pH value which considerably increases the phosgenation time. No measures for a polycondensation reaction are described.

According to the EP 0,263,432, chloroformyl-terminated condensates or polycarbonates can be produced from aqueous diphenolate solution and organic solution by introducing phosgene into a heterogeneous mixture at pH values of 8 to 11, at temperatures of 15° to 50° C. and with a phosgene excess of at least 10 mol-% and continuing the phosgenation reaction with simultaneous introduction of alkali metal or alkaline earth metal hydroxides. Preferred phase ratios are 0.4–1 to 1 water-to-oil ratios, water being subsequently added.

According to DOS 2,725,967, it is favorable to the conversion of phosgene of a continuous process if the aqueous phase and the organic phase containing dissolved phosgene are initially combined in a tube and subsequently introduced into a reactor of the tank type. The residence time in this tube should be between 0.5 and 15 seconds. The phosgene excess of the reaction is at least 10 mol-%. The disadvantage lies in the fact that the phosgene excess is still extremely high. In addition, the process is attended by the disadvantage that the phosgenation reaction takes place at unfavorable phase ratios (oil-to-water 0.2 to 1) so that phase separation on completion of the reaction is definitely possible.

According to EP 0,306,838-A2, the phosgenation reaction is monitored in situ using an automatic chloride detector. Carrying out the process in which way suppresses variations in the chemism of the reaction and is said distinctly to improve the technical properties of the polycarbonates. The concept on which the process is based lies in the recycling of unreacted diphenolate to the process. However, the process is attended by the disadvantage of secondary phosgene reactions which even take place during recycling.

According to EP-0,339,502-A2, the secondary phosgene reactions are said to be increased by the presence of a high initial sodium hydroxide concentration. According to this patent, therefore, the diphenol/sodium hydroxide/water solution is combined with the organic phases in an alkali/hydroxy ratio of less than 2:1 (less than equivalent quantity of alkali metal hydroxide), oligomers having a molecular weight of 300 to 3,000 g/mol being formed in this first reaction stage. The water-to-oil phase ratios are greater than 1. In addition, the secondary phosgene reactions are still extremely favorable.

According to EP-0,304,691-A2, a fine emulsion produced by intensive mixing is favorable to the reaction in the two-phase interfacial process, albeit with a very large excess of phosgene (20 to 100 mol-% excess). The large quantity of phosgene promotes good phase separation despite intensive mixing of the emulsion at the beginning of the reaction. However, the conversion of phosgene to polycarbonate is extremely unfavorable.

German patent application P 4 118 232.4 (Le A 28 238) describes a special process for avoiding secondary phosgene reactions in which the sodium hydroxide solution is added in a special form.

To improve the volume-time yield of existing reactors, it was logical to increase the concentrations of the reactants. However, their solubility in the carrier medium (organic solvent or water) is only limited, so that higher temperatures have to be applied. The resulting faster reactions also lead to more secondary reactions which inter alia reduce the phosgene yield.

DETAILED DESCRIPTION OF THE INVENTION

It is an object of the present invention was to improve the phosgene yield in a special reactor system, namely a tube reactor followed by a tank, equipped with a stirrer optionally with a circulation pipe, and the volume-time yield with a particularly favorable consumption of raw materials at relatively high temperatures.

Despite the fact that the secondary reactions would also normally be expected to have an adverse affect at relatively high temperatures (see, for example, DOW's concession documents for the polycarbonate plant in Stade, Germany, which were laid open to public inspection in 1989) it has now been found in accordance with the invention that the reactor system of a tube reactor and a following stirred tank reactor—optionally with a circulation pipe for back-mixing—for the two-phase interfacial process for the production of polycarbonates in high volume-time yields utilizes the starting materials, above all phosgene, particularly effectively providing the following steps are taken:

1. preheating a 25 to 30% Na$_2$BPA solution to at least 45° C. (percentages by weight being based on the weight of Na2 BPA in aqueous solution), the solution containing only little free sodium hydroxide (pH ≦ 11.3), 2. introducing gaseous phosgene in methylene chloride or chlorobenzene or a mixture of methylene chloride and chlorobenzene, optionally under a pressure of 1 to 10 bar, in such quantities that a molar phosgene excess of 5 to 65 mol- %, based on the quantity of Na$_2$BPA used in step 1, is present, 2a. the gaseous phosgene optionally being introduced by high-performance mixing units, optionally under pressure, in order to avoid any relatively large phosgene buffer in the production plant, 3. combining the two solutions in a mixer to form a mixed emulsion and transporting the mixed emulsion at least partly against gravity into a tube reactor, 4. in which, after a residence time of at least 10 seconds without dissipation of the heat of reaction, sodium bisphenolate is optionally introduced—in cases where phosgene was introduced in a large excess in step 2—so that a net phosgene excess of at most 10 mol- % is present, based on the total quantity of sodium bisphenolate introduced, 5. chain terminator, preferably phenol, p-tert. butyl phenol or isooctyl phenol, dissolved in aqueous or dissolved in organic phase is subsequently added, optionally still in the reaction tube, sodium hydroxide also being added shortly beforehand, at the same time or shortly afterwards in order to establish a pH value of 11 to 14, the heat of reaction is subsequently dissipated in a tank equipped with a stirrer and the polymer chain is built up with addition of sodium hydroxide and catalyst, preferably triethyl amine or N-ethyl piperidine, the emulsion in the reaction tube and remaining therein being a water in-oil emulsion (w/o) and the emulsion in the tank being an oil-in-water emulsion (o/w).

Accordingly, the present invention relates to a process for the continuous production of thermoplastic aromatic polycarbonates in a reactor system comprising a tube reactor and a following tank equipped with a stirrer, the stirred tank optionally comprising a circulation pipe for back-mixing of the reaction mixture, characterized in that 1. a 25 to 30% by weight dialkali diphenolate solution in water containing only little free alkali metal hydroxide (pH ≦ 11.3), is preheated to at least 45° C. and preferably to a temperature of 45° to 90°°C., 2. gaseous phosgene is introduced in CH$_2$Cl$_2$ and/or in chlorobenzene, optionally under pressure of 1 bar to 10 bar, in such a quantity that a molar excess of 5 mol-% to 65 mol- %, based on the quantity of alkali diphenolate used in step 1, is present, 2a. the phosgene optionally being introduced by high performance mixing units, optionally under a pressure of up 10 bar, in order to avoid any relatively large phosgene buffer in the production plant, 3. the solutions prepared in 1 and 2 are combined in a mixer to form a mixed emulsion which is then transported at least partly against the force of gravity into a tube reactor in which 4. after a residence time of at least 10 seconds and preferably 10 seconds to 30 seconds without dissipation of the heat of reaction, 5% to 35% dialkali diphenolate solution in water is optionally introduced so that a net phosgene excess of at most 10 mol- %, based on the total molar quantity of dialkali diphenolate used, is present, 5. chain terminator dissolved in aqueous phase or organic phase is subsequently added, optionally still in the reaction tube, a pH value of 11 to 14 being established by addition of aqueous NAOH solution shortly before, at the same time as or shortly after addition of the chain terminator, and 6. the heat of reaction is subsequently dissipated in a tank equipped with a stirrer and the polycondensation reaction is completed by addition of aqueous sodium hydroxide and catalyst.

The process is suitable for the production of known polycarbonates of known molecular structure based on bisphenol A. A mixture of bisphenol A with other known diphenols may optionally be used instead of pure bisphenol A. In this case, the following description applies to the corresponding mixture.

Suitable organic solvents are methylene chloride, monochlorobenzene or a mixture of both solvents.

In step 1, a 25 to 30% sodium bisphenolate solution is preheated to at least 45° C. Preferred preheating temperatures are those at which the given concentration (for example 30%) of sodium bisphenolate still just dissolves in the aqueous solution. The solution is preferably prepared in such a way that it contains very little free sodium hydroxide (excess sodium hydroxide) Excess sodium hydroxide is always present when, for a given temperature and concentration of bisphenol used, more sodium hydroxide is used than is necessary for dissolving the bisphenol. In general, the preheating temperatures are in the range from 45° to 90° C.

In step 2, gaseous phosgene is introduced into the solvent. The solvent may optionally have been preheated to a temperature of 30° C. to 90° C. under a pressure of 1 to 10 bar. Preferred temperatures are the temperatures used in step 1.

Suitable mixers for step 2a are static mixers, more particularly those of the BKM type, two-component nozzles having a holding time and mixing time of at least 20 milliseconds, such as for example solid-cone nozzles, hollow-cone eccentric nozzles, axial hollow-cone nozzles and pneumatic spray nozzles, perforated disk nozzles, etc.

The same mixers or different mixers may be used in step 3. In some cases, simple T pipe sections may be sufficient for mixing.

Sodium bisphenolate is optionally introduced in step 4 in cases where a large excess of phosgene has been used in step 2.

In step 5, the chain terminator may be added either as phenolate, i.e. dissolved in aqueous NaOH, or as phenol, i.e. dissolved in organic phase.

The heat of reaction is dissipated in a stirred tank. Virtually any stirrer by which the emulsion can be adequately mixed under control may be used.

In a particularly preferred embodiment, an oil-in water emulsion is present in the stirred tank. In this case, the preferably continuous process may advantageously be started up by initially introducing this type of emulsion or only an aqueous phase into the stirred tank. The stirred tank (a tank equipped with a stirrer) may optionally comprise a circulation pipe to improve back-mixing and to optimize the holding-time distribution. The stirred tank with the recirculation pipe may even be a pump recirculation reactor with a heat exchanger, pump, degassing vessel and further internal mixing units, preferably static mixers.

Residual gases, particularly excess chlorine or carbon monoxide, are removed from the reaction via an outlet in the stirred tank and are either returned for combination with phosgene or are delivered to a phosgene disposal facility.

The polycarbonates are isolated by known methods, preferably steam stripping, precipitation, concentration by evaporation or spray evaporation.

The polycarbonates obtainable by the process according to the invention have molecular weights Mw (weight average, as determined by gel permeation chromatography) in the range from 15,000 to 200,000 g/mol and preferably in the range from 17,000 to 100,000 g/mol.

The polycarbonates may be processed in known manner to various moldings, for example films, by extrusion or injection molding.

The polycarbonates obtainable in accordance with the invention are used for known industrial applications, for example in the electrical field and in the automotive field.

The tests on which the Examples are based were carried out in a 1 liter laboratory reactor equipped with a blade stirrer (of the type manufactured by the Buchi company). The reactor is provided with a cooling jacket through which the heat of reaction can be dissipated as required. Connected to the reactor is a heatable storage vessel from which aqueous NaBPA solution can be instantly introduced into the reactor.

The laboratory installation was selected to reproduce the conduct of the reaction in the above-described reactor system of the tube reactor and the following stirred tank.

The invention is further illustrated but is not intended to be limited by the following examples in which all parts and percentages are by weight unless otherwise specified.

EXAMPLES

Example 1

200 g methylene chloride were introduced into the reactor and 36 g (0.363 mol) phosgene were dissolved therein with vigorous stirring (corresponding to step 2).

240 g water, 76 g BPA (0.33 mol) and 26.4 g NaOH (0.66 mol) were heated to approximately 50° C. in the storage vessel and intensively mixed until a homogeneous solution was formed (corresponding to step 1).

The aqueous $Na_2BPA$ solution was instantly introduced into the reactor with vigorous stirring. The temperature of the emulsion formed rose during phosgenation to approximately 80° C. (corresponding to step 3).

After 1 minute, 0.56 g phenol (0.006 mol) in 5.5 g 25% NaOH (0.03% mol) was introduced (corresponding to step 5).

After 10 minutes, the emulsion was cooled to 30° C. 1.5 g 5% N-ethyl piperidine solution in methylene chloride and 17.6 g 25° C. NaOH (0.11 mol) were then added. The temperature was kept at 30° C. (corresponding to step 6).

After another 10 minutes, the reaction was terminated by switching off the stirrer and separating the emulsion. Analysis: molecular weight of the polycarbonate: 28,000; rel. viscosity (0.5% in methylene chloride): 1.28; BPA content of the mother liquor: 500 ppm; carbonate content of the mother liquor: 0.6%.

A high conversion of phosgene to polycarbonate and a readily separable emulsion were obtained in this way.

Example 2

200 g methylene chloride were introduced into the reactor and 36 g (0.363 mol) phosgene dissolved therein with vigorous stirring (corresponding to step 2).

240 g water, 76 g BPA (0.33 mol) and 26.4 g NaOH (0.66 mol) were heated to around 50° C. in the storage vessel and intensively mixed until a homogeneous solution was formed (corresponding to step 1).

220 g of the total of 331.3 g of aqueous $Na_2BPA$ solution were instantly introduced into the reactor with vigorous stirring. The temperature of the emulsion rose during phosgenation to approximately 80° C. (corresponding to step 3).

After 30 seconds, the remaining 111.3 g of the aqueous $Na_2BPA$ solution were introduced into the reactor, the W/o emulsion changing into an o/w emulsion (corresponding to step 4).

After 2 minutes, 0.56 g phenol (0.006 mol) in 5.5 g 25% NaOH (0.034 mol) was introduced (corresponding to step 5).

After 10 minutes, the emulsion was cooled to 30° C. 1.5 g 50 N-ethyl piperidine solution in methylene chloride and 17.6 g 250 NAOH (0.11 mol) were then added. The temperature was kept at 30° C. (corresponding to step 6).

After another 10 minutes, the reaction was terminated by switching off the stirrer and separating the emulsion. Analysis: molecular weight of the polycarbonate: 28,000; rel. viscosity (0.5% in methylene chloride): 1.28; BPA content of the mother liquor: 500 ppm; carbonate content of the mother liquor: 0.6%.

A high conversion of phosgene to polycarbonate and a readily separable emulsion were obtained by carrying out the reaction in this way.

Example 3 (Comparison Example)

200 g methylene chloride were introduced into the reactor and 36 g (0.363 mol) phosgene dissolved therein with vigorous stirring (corresponding to step 2).

240 g water, 76 g BPA (0.33 mol) 0.56 g phenol (0.006 mol) and 30 g NaOH (0.75 mol) were heated to approx. 55° C. in the storage vessel and intensively mixed until a homogeneous solution was formed (corresponding to step 1).

The aqueous $Na_2BPA$ solution was instantly introduced into the reactor with vigorous stirring. The temperature of the emulsion formed rose during phosgenation to approximately 85° C. (corresponding to step 3) After 10 minutes, the emulsion was cooled to 30° C. 1.5 g 50 N-ethyl piperidine solution in methylene chloride and 8.6 g 250 NAOH (0.054 mol) were then added. The temperature was kept at 30° C. (corresponding to step 6) After another 10 minutes, the reaction was terminated by switching off the stirrer and separating the emulsion. Analysis: molecular weight of the polycarbonate: 3,000; rel. viscosity (0.50 in methylene chloride): 1.05; BPA content of the mother liquor: 3,500 ppm; carbonate content of the mother liquor: 1.10.

The yield of phosgene obtained by carrying out the reaction in this way was too low to produce a polycarbonate of high molecular weight.

Example 4 (Comparison Example)

200 g methylene chloride were introduced into the reactor and 45.7 g (0.462 mol) phosgene dissolved therein with vigorous stirring (corresponding to step 2).

240 g water, 76 g SPA (0.33 mol) 0.56 g phenol (0.006 mol) and 30 g NAOH (0.75 mol) were heated to approx. 55° C. in the storage vessel and intensively mixed until a homogeneous solution was formed (corresponding to step 2).

The aqueous $Na_2BPA$ solution was instantly introduced into the reactor with vigorous stirring. The temperature of the emulsion formed rose during phosgenation to approximately 90° C. (corresponding to step 3) After 10 minutes, the emulsion was cooled to 30° C. 1.5 g 50 N-ethyl piperidine solution in methylene chloride and 76.8 g 250 NaOH (0.48 mol) were then added. The temperature was kept at 30° C. After another 10 minutes, the reaction was terminated by switching off the stirrer and separating the emulsion. Analysis: molecular weight of the polycarbonate:28,000; rel. viscosity (0.50 in methylene chloride): 1.28; BPA content of the mother liquor: 1,500 ppm; carbonate content of the mother liquor: 2.10.

Carrying out the reaction in this way produced the desired product. The conversion of phosgene to Polycarbonate was low. The concentrations of carbonate and sodium chloride in the mother liquor were high by comparison with the other reactions.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

We claim:

1. A process for the continuous production of a thermoplastic aromatic polycarbonate in a reactor system which includes a tube reactor and a tank equipped with a stirrer, comprising
   (i) preheating to at least 45° C. a 25 to 30% by weight dialkali diphenolate solution in water
   (ii) introducing gaseous phosgene in at least one member selected from the group consisting of $CH_2Cl_2$ and chlorobenzlene, to form a phosgene solution containing 5 to 65 mol % excess based on the quantity of said dialkali diphenolate,
   (iii) combining said phosgene solution with said dialkali diphenolate solution in a mixer to form a mixture and transporting said mixture at least partly against the force of gravity into said tube reactor to facilitate a polycondensation reaction and in which after a residence time of at least 10 seconds and without dissipation of the heat of reaction, adding a chain terminator, and establishing a pH value of 11 to 14 by adding an aqueous NaOH solution shortly before, at the same time as or shortly after the adding said chain terminator, and
   (iv) dissipating said heat of reaction in said tank and
   (v) adding aqueous sodium hydroxide and a catalyst selected from the group consisting of triethyl amine and N-ethyl piperidine to complete said reaction.

2. The process of claim 1 wherein said preheating is to a temperature of 45° to 90° C.

3. The process of claim 1 wherein said (ii) is under a pressure of 1 bar to 10 bar.

4. The process of claim 1 wherein said introducing of phosgene is with high-performance mixing units.

5. The process of claim 4 where said introducing is under pressure of up to 10 bar.

6. The process of claim 1 wherein said tank contains a circulation pipe for backmixing.

7. The process of claim 1 wherein after said residence time 5 to 35% dialkali diphenolate solution in water is introduced in said tube reactor to render a net phosgene excess of at most 10 mol- %, based on the total molar quantity of dialkali diphenolate.

8. The process of claim 1 wherein said dialkali diphenolate is disodium diphenolate of bisphenol-A.

* * * * *